April 2, 1968 F. R. MICHAEL 3,375,597
VOLUMETRIC MEASURING DEVICE
Filed Aug. 24, 1965 2 Sheets-Sheet 1
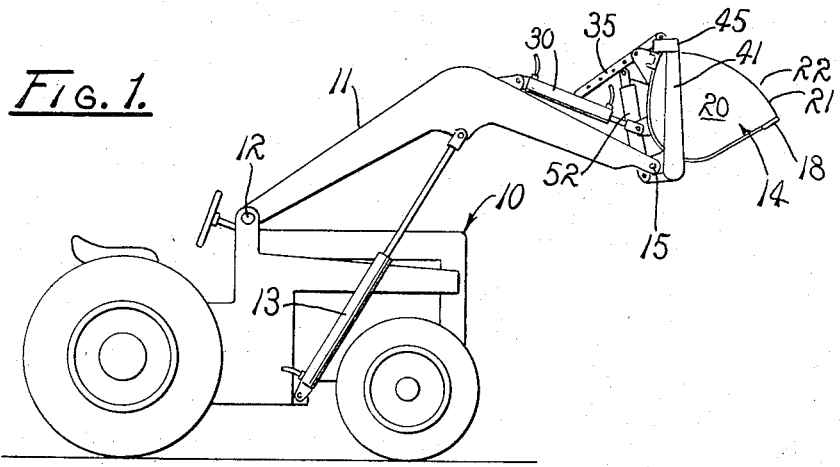
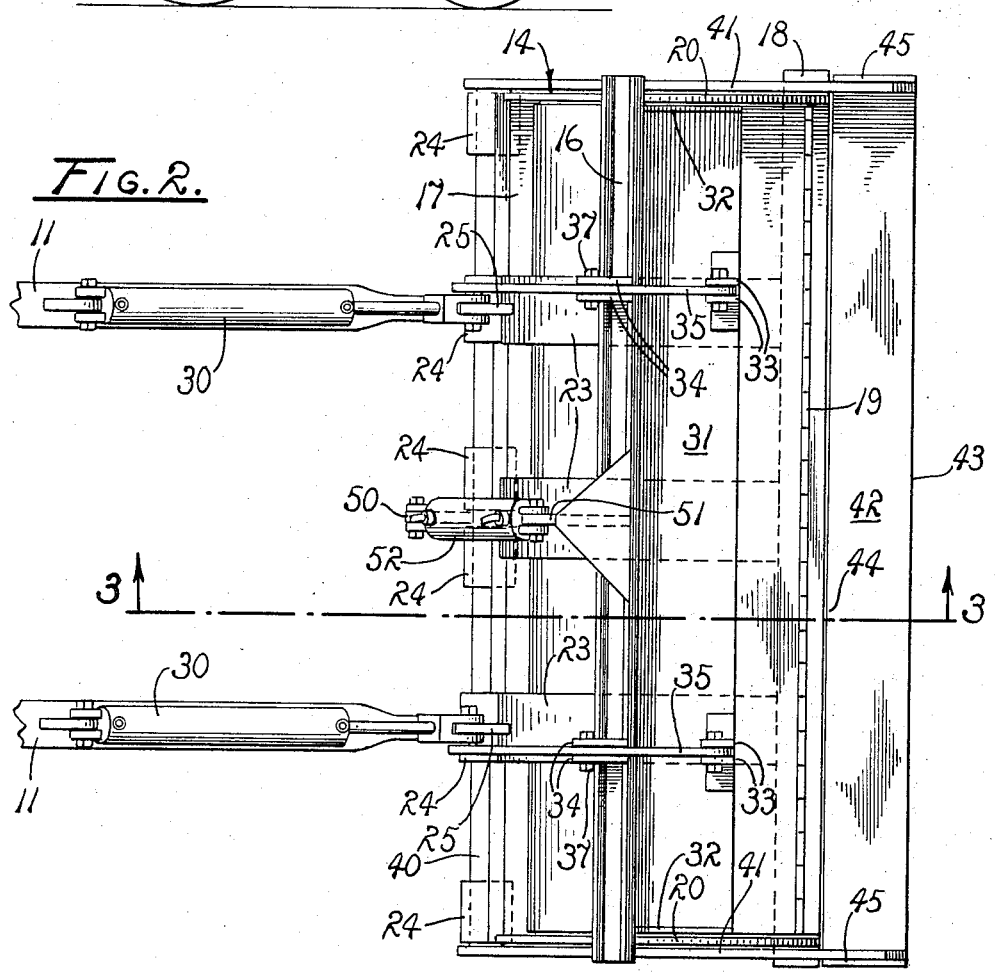
FRANK R. MICHAEL
INVENTOR
Huebner & Worrel
ATTORNEYS

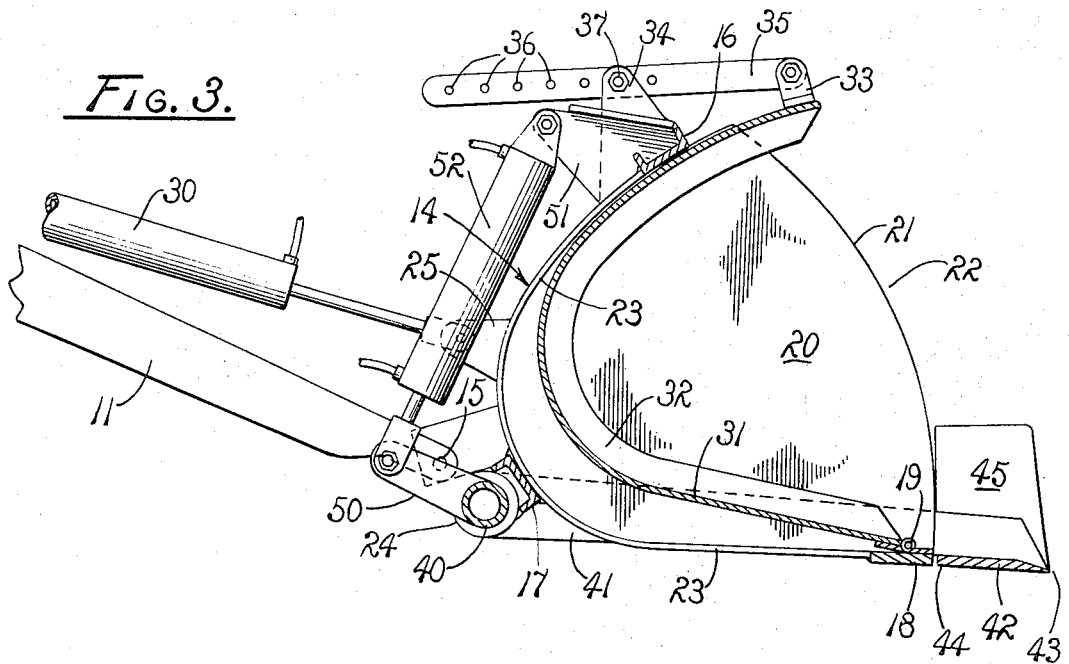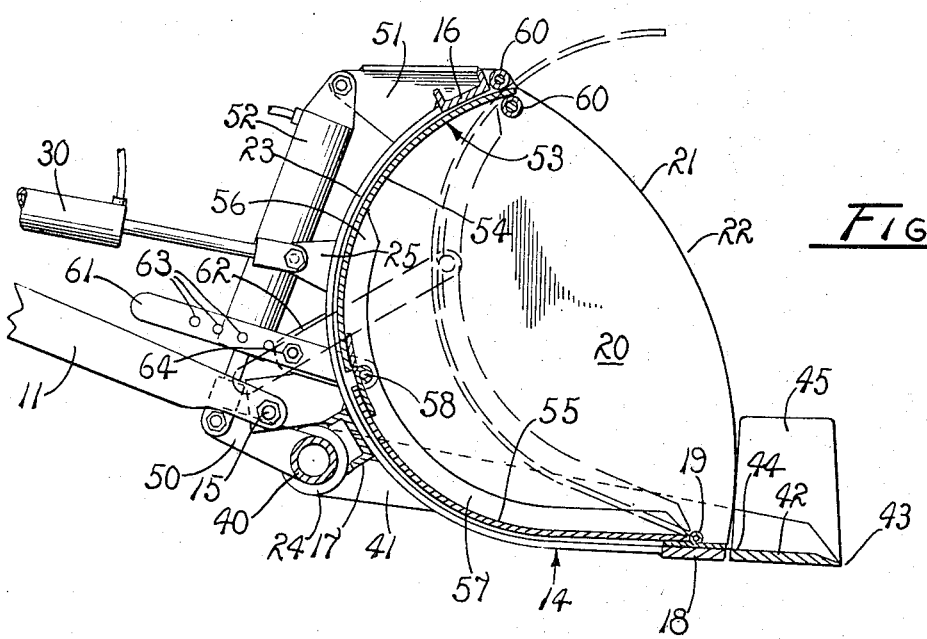

United States Patent Office 3,375,597
Patented Apr. 2, 1968

3,375,597
VOLUMETRIC MEASURING DEVICE
Frank R. Michael, Box 95, Waukena, Calif. 93282
Filed Aug. 24, 1965, Ser. No. 482,094
5 Claims. (Cl. 37—141)

ABSTRACT OF THE DISCLOSURE

A volumetric measuring device providing a bucket mounted on a vehicle and adapted for movement between a lowered material loading position and an upwardly spaced material transporting and discharging position including arm means on the bucket mounting a planar member for reciprocal movement across the face of the bucket and having a lower position with the planar member disposed in substantially coplanar relation with the bottom of the bucket in forwardly extended relation therefrom to define a scraper blade for the bucket in its lowered material loading position and during movement toward said upper edge of the bucket said planar member providing a screed to strike excess material from the face of the bucket.

---

In many commercial enterprises it is necessary to measure large quantities of bulk materials in precise amounts for cost computation, for formulation according to predetermined specifications, or to meet other requirements. For example, in the ready-mix concrete business, it is necessary to mix large quantities of aggregate and cement. It is customary to follow a formula which designates the amounts of cement, sand, gravel, and water to be mixed in order to produce concrete of predetermined characteristics. However, until the present invention, no device had been devised which allowed accurate measuring of large quantities of such materials in a sufficiently convenient and expeditious manner.

Conventionally the quantities of materials are designated by volume. However, it has heretofore been found somewhat faster to rely on weight as an index of volume. When weight is relied upon, the measurement must, of course, be determined on a scale of some type. Not only is this a cumbersome and time consuming operation, but it frequently introduces error. Often the supplies of constituent materials are not entirely pure. For example, large amounts of water may be contained in a supply of sand. The resultant increase in weight of a specific quantity of the sand can cause gross errors when weight is relied upon as the measuring factor. This is a type of error for which it is difficult if not impossible precisely to allow. As a result there is wide variation in the quality and cost of successive batches of concrete. This is of course because in a material such as sand in which large amounts of water are contained, though its total weight is appreciably increased, its volume increase is negligible. Similar problems are frequently encountered in the weighing of other bulk materials.

The result has been that such measuring operations have been somewhat less than satisfactory.

Accordingly, it is an object of the present invention to provide an improved volumetric measuring device.

Another object is to provide such a device which is volumetrically adjustable.

Another object is to provide a device which acts both as a measuring device and as a transporting and loading device.

Another object is to provide such a device having a screed to remove excess material therefrom.

Another object is to provide a device having a member serving as a combined scraper blade and screed blade.

Another object is to provide a device which conveniently and quickly can be used to measure a predetermined volume of material.

Another object is to provide such a device which may easily be adapted for use on a variety of vehicles.

A further object is to provide such a device which is of simple construction.

A still further object is to provide such a device which is inexpensive to build and operate.

These, together with other objects, will become more fully apparent upon reference to the following description and accompanying drawings.

In the drawings:

FIG. 1 is a side elevational view of the volumetric measuring device of the first form of the invention mounted on a vehicle for transport purposes.

FIG. 2 is a top view of the first form of the invention.

FIG. 3 is a vertical longitudinal section taken on line 3—3 of FIG. 2.

FIG. 4 is a vertical longitudinal section of a volumetric measuring device of a second form of the invention which corresponds to FIG. 3 but shows an inner bucket thereof in two different positions of adjustment.

First form

Referring in greater particularity to the drawings, a vehicle 10 having a forward end portion provides two parallel support booms 11 extending in the normal direction of movement of the vehicle from its forward end portion, as shown in FIG. 1. As is well known, the booms are pivotally mounted on the vehicle, as at 12, and are elevationally adjustable by means of hydraulically controlled rams 13, at each side of the vehicle. Pivotally affixed between the support booms at the distal ends thereof is a concave frame or outer bucket 14 having upper and lower edges and a bottom therebetween. The bucket is mounted on trunnions 15 engaged in the forward ends of the booms. The outer bucket has longitudinally extended channel members 16 and 17 and a flat bar member 18 spaced about its rearward periphery from its upper to its lower edges. The bar member 18 mounts a hinge 19 longitudinally coextensive therewith. The members 16, 17, and 18 are in normal engagement near their ends with parallel closed ends 20 which provide corresponding forwardly projecting convex edges 21 and define an open face 22 therebetween. The ends of the channel member 16 and flat bar member 18 extend short distances beyond each of the closed ends. Extending between and transversely of the channel members 16 and 17 and bar member 18 are spacer members 23.

Affixed rearwardly of the outer bucket 14 on channel member 17 are shaft bearings 24. Above each of the trunnions 15, a flange 25 is mounted rigidly on the bucket and rearwardly extended therefrom. An hydraulically controlled ram 30 pivotally interconnects each of the flanges 25 and its respectively adjacent boom.

A concave inner bucket 31 is mounted on the hinge 19. The inner bucket is fitted to the interior of the outer bucket 14. Rigid arcuate stiffening members 32 are affixed at both ends of the inner bucket parallel to the closed ends 20 of the outer bucket for insuring the rigidity of the inner bucket. Extending upwardly from the upper edge of the inner bucket and forwardly of the upper edge of the outer bucket are flanges 33. Affixed on the channel member 16 and in line with the flanges 33 are flanges 34. Adjustably interconnecting each pair of flanges 33 and 34 is a calibrated positioning arm 35 having one end pivotally connected to its flange 33 and providing a series of bores 36 adapted selectively to receive a nut and bolt assembly 37 in releasable connection to the flange 34.

A mounting shaft 40 is rotatably secured in the shaft bearings 24 and extends slightly beyond each of the closed ends 20 of the outer bucket 14. Affixed to each end of the shaft and extending forward parallel to the closed ends are support arms 41. Provided between the forwardmost ends of the arms across the open face is a cross member 42 adapted to be moved in a predetermined path of travel concentric to the shaft 40 between upper and lower positions and having a forward projecting scraper blade 43, a rearward screed blade 44, and side walls 45. A lever 50 is radially extended centrally of the shaft rearwardly away from the outer bucket 14. Extending rearwardly of the outer bucket from the channel member 16 is a flange 51. Pivotally mounted at one of its ends on the flange 51 is an hydraulic ram 52 with the other of its ends in pivotal connection with the distal end of the lever 50.

Second form

The second form of the invention is substantially similar to that of the first form and is shown in FIG. 4. All elements shown in the second form which are identical to corresponding elements in the first form have been given the same identifying numerals. An inner bucket 53 of the second form of the invention is composed of upper and lower substantially similar concave sections 54 and 55, respectively. Rigid arcuate stiffening members 56 and 57 are affixed to the ends of both the upper and lower sections to maintain the rigidity of each section. The lower section 55 is pivotally mounted at its lower forward edge on the hinge 19. The sections are pivotally interconnected by a horizontal hinge pin 58. Two parallel rollers 60 are mounted between the ends 20 adjacent to the channel member 16. One of the rollers is below and slightly forwardly of the other. The upper forward portion of the upper section is slidably received between the rollers. Positioning bars 61 are pivotally connected to the hinge pin 58 of the inner bucket and extend rearwardly through the outer bucket. Adjustment flanges 62 are pivotally mounted on the spacer members 23 of the outer bucket adjacent to their respective bars. The bars have a series of bores 63 therein adapted selectively to receive a nut and bolt assembly 64 for connection of the bar to its respective flange 62 so as to hold the inner bucket in adjustable position in the outer bucket.

OPERATION

First form

The operation of the described embodiments of the subject invention is believed readily apparent and is briefly summarized at this point. In order to measure bulk materials, the vehicle 10 is moved to a position in which the outer bucket 14 supported on the booms 11 is adjacent to a supply of the material, not shown. The booms 11 are then lowered by the rams 13 in the well known manner to place the outer bucket 14 in sliding engagement with the ground, as shown in FIGS. 3 and 4 and the rams 30 are manipulated so that the open face 22 of the outer bucket is in facing alignment with the supply of the material. At this time, the cross member 42 is maintained in the lowered position with its supporting arms 41 at rest against the extended ends of the bar member 18. So positioned, the cross member acts as a forward extension of the bottom of the inner bucket 31 with the screed blade 44 adjacent to the hinge 19. The calibrated positioning arms 35 are now selectively positioned in engagement with the flanges 33 at the indicated positions along their surfaces corresponding to the desired capacity of the inner bucket 31 and hence the amount of the material to be measured. Consequently the inner bucket is pivoted about the hinge 19 to the position in which the capacity indicated on the positioning rods is defined within the outer bucket by the inner bucket, closed ends 20, and the eventual path of movement of the screed blade across open face 22, as shown in FIGS. 2 and 3.

Subsequently the vehicle 10 is driven forward so that the device is forced into the supply of the material. The material is thus forced over the scraper blade 43 between the side walls 45 through the open face 22 and into the inner bucket 31 until the space defined by the inner bucket, closed ends 20, and open face is entirely filled. As the outer bucket 14 is then raised by the booms 11, the hydraulic rams 30 are actuated in order to rotate the outer bucket upwardly and toward the vehicle so that the open face 22 is facing in an upward direction, as shown in FIG. 1. Subsequently the hydraulic ram 52 is actuated to move the outer end of the lever 50 in a direction away from the ram and hence to move the connected shaft 40 and arms 41 so that the cross member 42 moves over the open face in its predetermined path of travel toward its upper position until the side walls 45 on the arms abut against the extended ends of the channel member 16, as shown in FIG. 1. In this action the screed blade 44 of the cross member strikes off any excess material extending through the open face. Thus the precise amount of the material indicated by the calibrated positioning arms is defined within the inner bucket, the closed ends, and the path of movement of the screed blade over the open face. During the upward travel of the screed, the side walls 45 serve to confine excess material removed by the screed for upward travel with the screed to aid in filling any voids inadvertently formed in the bucket.

With the device oriented in the position of FIG. 1, the material in the inner bucket 31 may be transported to any desired location and subsequently dumped. Dumping is of course accomplished by the actuation of the hydraulic rams 30 to rotate the outer bucket 14 downwardly and away from the vehicle until the material contained therein falls from the inner bucket under the force of gravity.

Second form

The operation of the second form of the invention is substantially identical to that of the first form and need not be recounted here with the exception of the positioning of the inner bucket 53 within the outer bucket 14. In order to adjust the capacity of the inner bucket, the calibrated positioning bars 61 are correspondingly selectively positioned in engagement with the adjustment flanges 62 at the indicated positions along their surfaces corresponding to the desired capacity of the inner bucket 53 and hence the amount of material to be measured. If the inner bucket is adjusted to a smaller capacity, the upper edge of the upper section 54 is moved forwardly through the roller members 60. At the same time the inward movement of the positioning arm into the outer bucket and against the pin 58 causes the upper and lower sections 54 and 55 to pivot with respect to each other about the pin 58, as shown in dashed lines in FIG. 4. Simultaneously, the lower section is rotated about the hinge 19. When the arms are secured to the flanges, the desired capacity, as indicated on the calibrated positioning arms, is defined within the outer bucket by the upper and lower sections of the inner bucket, the closed ends 20, and the path of movement of the screed blade across the open face 22. When the arms are retracted, the pin 58 is drawn rearwardly, the upper section of the inner bucket is drawn downwardly between the rollers and the capacity correspondingly increased.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A volumetric measuring device comprising:
   (A) a vehicle having a predetermined forward end portion;

(B) a boom pivotally mounted on the vehicle and forwardly extended therefrom for adjustable elevational movement;
(C) a bucket having an open face, upper and lower edges and a bottom therebetween, said bucket being pivotally mounted on the forwardly extended end of the boom;
(D) powered control means pivotally interconnecting the boom and the bucket whereby said bucket may be rocked between a predetermined loading position and a transport position,
  (1) said bucket having closed ends providing corresponding forwardly disposed convex edges;
(E) a powered arm pivotally mounted at each end of the bucket for movement about an axis substantially concentric to the convex edge of its respective end and forwardly extended therefrom; and
(F) a planar member providing a combined screed and scraper blade interconnecting the extended ends of the arms for reciprocal traversing movement during pivotal movement of the arms in a path across the face of the bucket along the convex edges of the ends thereof with said planar member being disposed substantially coplanar with said bottom of the bucket in its lowered loading position to provide an unobstructed opening for the bucket and said screed being forwardly extended to define the scraper blade.

2. A volumetric measuring device comprising:
(A) a vehicle having a predetermined forward end portion;
(B) a boom pivotally mounted on the vehicle and forwardly extended therefrom for adjustable elevational movement;
(C) an outer bucket having an open face, upper and lower edges, and a bottom therebetween, said bucket being pivotally mounted on the forwardly extended end of the boom;
(D) powered control means pivotally interconnecting the boom and the outer bucket whereby said bucket may be rocked between a predetermined loading position and a transport position,
  (1) said outer bucket having closed ends providing corresponding forwardly disposed convex edges;
(E) a powered arm pivotally mounted at each end of the outer bucket for movement about an axis substantially concentric to the convex edge of its respective end and forwardly extended therefrom; and
(F) a planar member providing a combined screed and scraper blade interconnecting the extended ends of the arms for reciprocal traversing movement during pivotal movement of the arms in a path across the face of the outer bucket along the convex edges of the ends thereof with said planar member being disposed substantially coplanar with said bottom of the bucket in its lowered loading position to provide an unobstructed opening for the bucket and said screed being forwardly extended to define the scraper blade;
(G) powered means connected to the arms for reciprocating the screed and blade between a lowered position with said blade substantially aligned with the lower forward edge of said bucket and a relative upper position;
(H) an inner bucket having an open face and providing a lower forward edge pivotally mounted in the outer bucket adjacent to the combined screed and blade in its lowered position, disposed within the outer bucket, and having an upper edge upwardly adjacent to said upper position of the screed and blade for pivotal movement toward and from the path of the screed to control the effective capacity of the inner bucket in relation to the path of the screed and blade,
  (1) the ends of the outer bucket functioning as ends for the inner bucket; and
(I) means interconnecting the upper edge of the inner bucket and the outer bucket in adjustably spaced relation.

3. A volumetric measuring device comprising:
(A) a vehicle having a predetermined forward end portion;
(B) a boom pivotally mounted on the vehicle and forwardly extended therefrom for adjustable elevational movement;
(C) an outer bucket having an open face and a bottom pivotally mounted on the forwardly extended end of the boom;
(D) powered control means pivotally interconnecting the boom and the outer bucket whereby said bucket may be rocked between a predetermined loading position and a transport position,
  (1) said outer bucket having closed ends providing corresponding forwardly disposed convex edges;
(E) an arm pivotally mounted at each end of the outer bucket for movement about an axis substantially concentric to the convex edge of its respective end and forwardly extended therefrom;
(F) a combined screed and scraper blade interconnecting the extended ends of the arms whereby said screed and blade are mounted for reciprocal traversing movement in a path across the face of the outer bucket along the convex edges of the ends thereof;
(G) powered means connected to the arms for reciprocating the screed and blade between a lowered position with said blade substantially aligned with the lower forward edge of said outer bucket and relative upper position;
(H) an inner bucket composed of upper and lower substantially similar concave sections in pivotal connection along a horizontal axis within and independent of the outer bucket, the forward edge of the lower section being in pivotal engagement along a horizontal axis with the forward edge of the outer bucket and adjacent to the combined screed and blade in its lowered position;
(I) horizontally positioned roller members disposed in spaced parallel relation along the upper edge of said outer bucket and the forwardly projecting portion of the upper section of the inner bucket being reciprocably received between said roller members,
  (1) the ends of the outer bucket functioning as ends for the inner bucket; and
(J) means in connection with the horizontal axis between the sections of the inner bucket for adjustably positioning said inner bucket toward or from the path of the screed to control the effective capacity of the spaced inner bucket in relation to the path of the screed and blade.

4. A volumetric measuring device adapted to be mounted for earth traversing movement on a vehicle comprising a bucket having an open face, spaced upper and lower edges and a bottom therebetween; means mounting the bucket on the vehicle for movement between a lowered material loading position and an upwardly spaced material transporting and discharging position; arm means pivotally mounted on the bucket; and a planar member mounted on said arm means for reciprocal movement across said face of the bucket including a lower position with the planar member disposed in substantially coplanar relation with said bottom of the bucket in forwardly extended relation therefrom to define a scraper blade for the bucket in its lowered material loading position and during movement toward said upper edge of the bucket said planar member providing a screed to strike excess material from the face of the bucket.

5. The volumetric measuring device of claim 4 in which said planar member includes spaced side walls to confine material therebetween and upon said blade so that during said upward movement of the planar member an excess of such material is carried upwardly therewith to insure complete filling of the bucket adjacent to its upper edge.

References Cited

UNITED STATES PATENTS

| | | | |
|---|---|---|---|
| 2,530,414 | 11/1950 | Wells | 37—117.5 |
| 2,664,753 | 1/1954 | Hein | 73—429 |
| 3,033,395 | 5/1962 | Lowery | 214—767 |
| 3,065,870 | 11/1962 | Granryd et al. | 214—767 |

ANTONIO F. GUIDA, *Primary Examiner.*

ABRAHAM G. STONE, *Examiner.*

A. E. KOPECKI, *Assistant Examiner.*